May 1, 1928.
W. G. ORTH ET AL
1,667,901
INDICATOR FOR TAXIMETERS
Filed Nov. 3, 1924   2 Sheets-Sheet 1
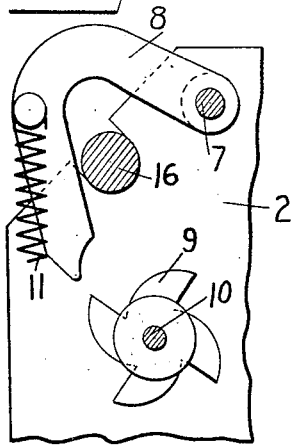
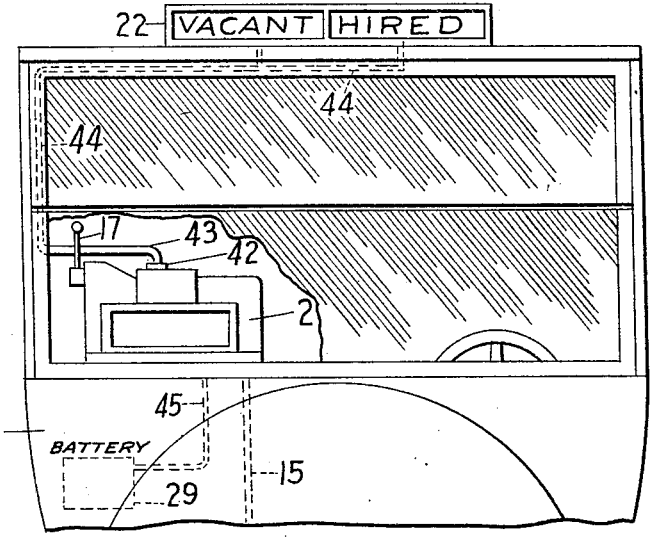
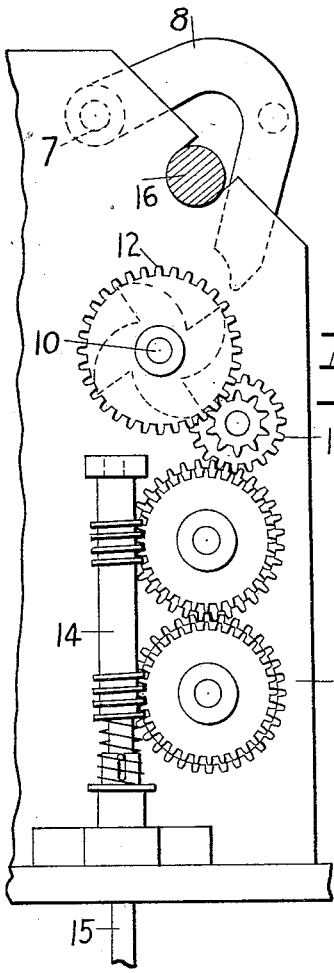
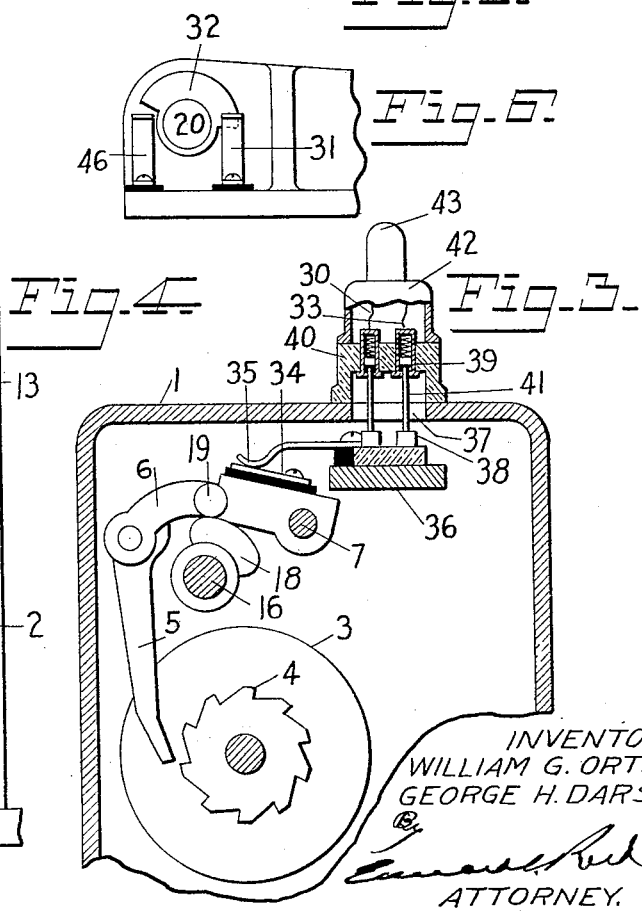
INVENTORS.
WILLIAM G. ORTH.
GEORGE H. DARST.
ATTORNEY.

May 1, 1928.
W. G. ORTH ET AL
INDICATOR FOR TAXIMETERS
Filed Nov. 3, 1924
1,667,901
2 Sheets-Sheet 2
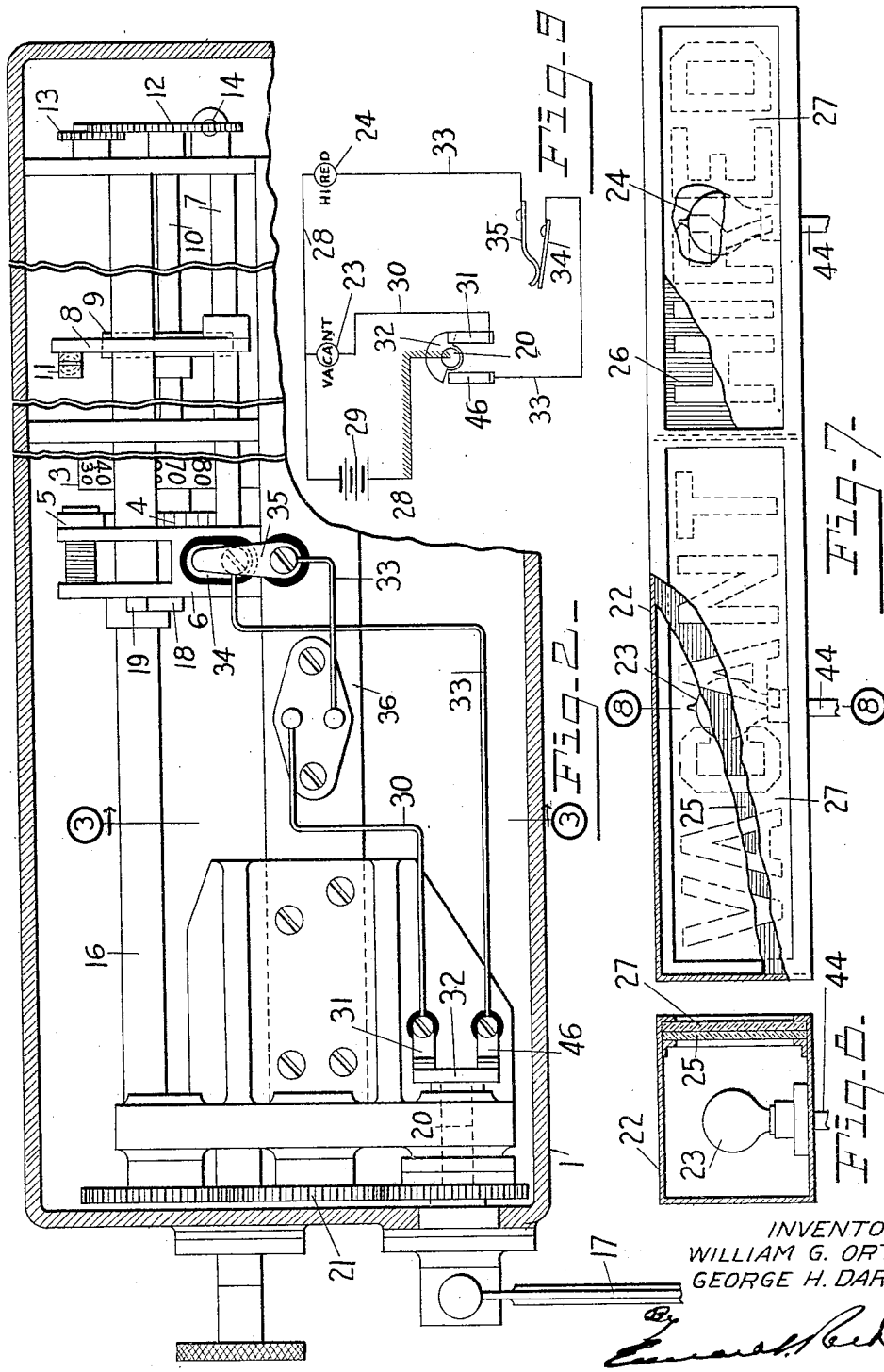
INVENTORS.
WILLIAM G. ORTH.
GEORGE H. DARST.
ATTORNEY.

Patented May 1, 1928.

1,667,901

UNITED STATES PATENT OFFICE.

WILLIAM G. ORTH AND GEORGE H. DARST, OF DAYTON, OHIO, ASSIGNORS TO OHMER FARE REGISTER COMPANY, OF DAYTON, OHIO.

INDICATOR FOR TAXIMETERS.

Application filed November 3, 1924. Serial No. 747,577.

This invention relates to new and useful improvements in indicators for taximeters.

One object of the invention is to provide means whereby a prospective passenger may, from a distance, ascertain whether or not the cab, equipped with the invention, is vacant or hired.

Another object of the invention is to provide means which will indicate to an inspector, or other person, whether or not the taximeter is actually counting when the cab is hired and is carrying a passenger.

Further objects of the invention will be described in the specification and particularly pointed out in the claims.

Referring to the accompanying drawings, Fig. 1 is a front elevation of a taxicab equipped with my invention; Fig. 2 is a top plan view of the taximeter with the casing shown in section; Fig. 3 is a section on the line 3—3 of Fig. 2; Fig. 4 is a detail view of the driving means of the counter; Fig. 5 is a detail view of the jumping cam; Fig. 6 is a detail view of the main electrical switch; Fig. 7 is a view of the indicator; Fig. 8 is a section on the line 8—8 of Fig. 7; and Fig. 9 is a diagram of the electrical circuits.

Referring more particularly to the drawings, 1 represents a taxicab, (Fig. 1), equipped with a taximeter 2 which, in the present instance, is of the type shown and described in the patent to Ohmer and Breidenbaugh of April 20, 1915, No. 1,136,164. The taximeter 2 is provided with the usual fare counter 3, (Figs. 2 and 3), having a ratchet 4 in operative relation with a pawl 5 carried by a frame 6 mounted on a rock shaft 7. The shaft 7 is suitably mounted in the frame of the taximeter and carries an arm 8, (Figs. 2, 4 and 5), in operative relation with a jumping cam 9 mounted on a shaft 10. The frame 6, shaft 7 and arm 8 are moved in one direction to actuate the counter 3, by a spring 11 and in the other direction by the jumping cam 9. The shaft 10 is suitably journaled in the frame of the taximeter and on its outer end carries a gear 12, (Fig. 2 and 4), connected, through a gear train 13, with a worm shaft 14 which in turn is connected with one of the wheels of the vehicle by a flexible shaft 15 in a well known manner. The movement of the vehicle will therefore actuate the counter 3; but it is to be understood that the counter may be actuated by a clock, (not shown), as is well known in the art and which is illustrated in detail in the patent above referred to.

The operative relation between counter and its actuating means is controlled by a setting shaft 16 suitably journaled in the frame of the taximeter. One end of the shaft 16 is connected to a shaft 20 through a gear train 21 (Fig. 2). The shaft 20 extends out of the casing and is provided with the usual flag 17 by means of which the shaft 16 is actuated. The shaft 16 carries a cam 18, (Figs. 2 and 3), adapted to engage a pin 19 on the frame 6 to elevate and to hold the pawl 5 out of operative relation with the ratchet 4 and the arm 8 out of operative relation with the cam 9. When the flag 17 is lowered and the shaft 16 and cam 18 rocked, the pawl 5 and arm 8 are released; and upon the subsequent operation of the cam 9 the frame 6 will reciprocate, thereby actuating the counter 3.

Mounted on top of the cab 1 and remote from the taximeter, as is shown in Fig. 1, is a duplex indicator 22, (Figs. 1, 7 and 8), having two compartments in which are mounted electric lamps 23 and 24. The fronts of the compartments are provided with transparencies 25 and 26, which are of contrasting colors and, individually, are provided with the words "Vacant" and "Hired". When either of the lamps 23 and 24 are lighted, its respective transparency is readable from the front of the cab; and to prevent the transparencies being readable, when the lamps are not lighted, the same are provided with a ground glass cover 27. The lamps 23 and 24 are provided with a common wire 28, (Fig. 9), which is grounded to the frame of the taximeter and in which a battery 29 is connected. The lamp 23 is provided with an individual lead wire 30 which connects with a brush 31, (Figs. 2 and 6), adapted to be in electrical contact with a multilated disk or circuit breaking member 32 mounted on the shaft 20 and rocked concurrently with the flag 17. The position of the disk 32, relative to the flag 17, is such that the brush 31 and disk 32 will be in electrical contact whenever the flag 17 is in an elevated position and the taximeter is out of operation. The lamp 23 will, therefore, be lighted and the indicator 22 will indicate that the cab is vacant. The lamp 24 is provided with an individual lead wire 33 which is connected to a brush 46 adapted to be in electrical contact with the disk 32 whenever the flag is lowered, the taximeter is in operation and the machine is hired. When this contact takes place, the lamp 24 will be lighted and the indicator 22 will indicate that the vehicle is occupied by a passenger. The disk 32 and brushes 31 and 46 form a duplex switch.

In addition to indicating that the cab is hired, the lamp 24 is instrumental in indicating to persons, such as inspectors, whether or not the counting mechanism of the taximeter is operating. For this purpose, the lead wire 33 is provided with an intermediate switch consisting of terminals or contact members 34 and 35. The terminal 34 is mounted on the counter actuating frame 6, (Fig. 3), while the terminal 35 is mounted on a member 36 of the frame of the taximeter. During the rocking motion of the shaft 7 and frame 6, during the process of counting, the terminals 34 and 35 will intermittently make and break the circuit, thereby giving a flickering light at the hirer portion of the indicator. The portions of the electrical circuits formed by the lead wires 30 and 33 are led out of the casing of the taximeter through an opening 37, (Fig. 3), and to permit the casing to be removed the said lead wires are connected to terminals 38 on the member 36 and to terminals 39 mounted in a boss 40 attached to the casing. The terminals 39 are provided with spring pressed pins 41 which make electric contact with the terminals 38. The boss 40 is provided with a cap 42 from which extends a rigid tubular arm 43 through which the lead wires pass. The arm 43 extends to the frame of the cab and connects with conduits 44. The rigid arm 43 which passes through the air prevents the lead wires from becoming damaged or broken. The conduit 44 leads to the indicator 22 while a conduit 45 leads to the battery 29.

Without limiting ourselves to the precise instrumentalities shown and described, which may be varied within the scope of the claims, we claim:

1. The combination with a taximeter comprising setting means, a counter, and an actuator for said counter, of an electrically operated indicator, a circuit for said indicator, a switch interposed in said circuit and controlled by said setting means, and a second switch interposed in said circuit and controlled by said actuator to cause the intermittent operation of said indicator when the first mentioned switch is closed.

2. The combination with a taximeter comprising setting means, a counter, and an actuator for said counter, of an electrically operated duplex indicator, circuits for the respective parts of said duplex indicator, a switch interposed in said circuits and connected with said setting means to control both parts of said indicator, and a second switch interposed in one of said circuits and connected with said actuator to intermittently break and close said circuit.

3. The combination with a taximeter comprising a casing, a shaft mounted within said casing, a flag connected with said shaft to impart rotatory movement thereto, a counter, and an actuator for said counter, of an electrically operated duplex indicator, circuits for the respective parts of said duplex indicator, a circuit breaker and closer to control both circuits, one member of said circuit breaker and closer being carried by said shaft, and a second circuit breaker and closer to control one of said circuits independently of the other, one member of said second circuit breaker and closer being carried by said actuator.

In testimony whereof, we affix our signatures hereto.

WILLIAM G. ORTH.
GEORGE H. DARST.